United States Patent
Perkins et al.

(10) Patent No.: US 7,236,590 B2
(45) Date of Patent: Jun. 26, 2007

(54) METHOD AND APPARATUS FOR PROTECTING DATA

(75) Inventors: Gregory Michael Perkins, Pennington, NJ (US); Prabir Bhattacharya, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1247 days.

(21) Appl. No.: 09/737,046

(22) Filed: Dec. 14, 2000

(65) Prior Publication Data

US 2002/0078364 A1 Jun. 20, 2002

(51) Int. Cl.
- *H04K 1/00* (2006.01)
- *H04L 9/00* (2006.01)
- *H04L 9/30* (2006.01)
- *H04K 1/10* (2006.01)

(52) U.S. Cl. .................. 380/30; 380/284; 713/171
(58) Field of Classification Search .................. 380/28, 380/284, 30; 713/171

See application file for complete search history.

(56) References Cited

U.S. PATENT DOCUMENTS

| | | | | |
|---|---|---|---|---|
| 4,926,479 A | * | 5/1990 | Goldwasser et al. | 713/180 |
| 5,249,295 A | * | 9/1993 | Briggs et al. | 717/157 |
| 5,892,899 A | | 4/1999 | Aucsmith et al. | |
| 5,991,408 A | * | 11/1999 | Pearson et al. | 713/186 |
| 6,823,068 B1 | * | 11/2004 | Samid | 380/28 |

OTHER PUBLICATIONS

Chor, Benny et al. "A Knapsack-Type Public Key Cryptosystem Based on Arithmetic in Finite Fields", 1988 IEEE.*

Cooper, Rodney H. "A More Efficient Public-Key Cryptosystem Using The Pascal Triangle", 1989 IEEE.*

Coutinho, S.C. The Mathematics of ciphers: number theority and RSA cryptography, 1999 AK Peters, Ltd., pp. 1-5 & 163-173.*

Dakin, Robert. "The Travelling Salesman Problem", 1997 <http://web.archive.org/web/*/http://www.pcug.org.au/~dakin/tsp.htm>.*

Desmedt, Yvo G. et al. "A Critical Analysis of the Security of Knapsack Pulic-Key Algorithms", 1984 IEEE.*

Management Science Modeling. "Mgmt Science Modeling Glossary", Mar. 1999.*

Menezes et al. Handbook of Applied Cryptography, 1997 CRC Press LLC, §8.6 and §13.3.*

Mertens, Stephan. "Construction Heuristics", May 1999 <http://itp.nat.uni-magdeburg.de/~mertens/TSP/node2.html>.*

Microsoft. "Computer Dictionary, Third Edition", 1997 Microsoft Press, p. 133.*

Schneir, Bruce. Applied Cryptography, Second Edition, 1996 John Wiley & Sons, pp. 151-155.*

(Continued)

*Primary Examiner*—Kambiz Zand
*Assistant Examiner*—Michael J. Simitoski
(74) *Attorney, Agent, or Firm*—RatnerPrestia

(57) ABSTRACT

A data structure to be used for representing the problem is selected. An instance of the problem is represented with the data structure. The data is encrypted with a sequence which is obtained by solving the problem. Alternatively, in an alternative embodiment of the present invention, a program for heuristically solving an NP-hard problem is received. A data structure that represents an instance of the problem is received. The program is applied to the instance of the problem to obtain a sequence. The data is decrypted with the sequence.

9 Claims, 8 Drawing Sheets

OTHER PUBLICATIONS

Trick, Michael A. "Heuristic Problem Solving", Oct. 1996, <http://mat.gsia.cmu.edu/mstc/heurnote/node5.html>.*

Aronsson, Hannu A. "Zero Knowledge Protocols and Small Systems", Aug. 2000, <http://web.archive.org/web/20000831005309/http://www.tml.hut.fi/Opinnot/Tik-110.501/1995/zeroknowledge.html>.*

British War Office (BWO). Manual Of Cryptography, 1997 Aegean Park Press (reproduction of classical, historical document, c. 1914), pp. 93-94.*

Lange, Larry. "More NT Security Woes", Apr. 1997, <http://www.pa.msu.edu/~hamlin/facts/0416hack.html>.*

Lucks, Stefan. "How to Exploit the Intractability of Exact TSP for Cryptography", 1994.*

Lucks, Stefan. "How Traveling Salespersons Prove Their Identity", IMA Conf. 1995, 142-149.*

McNett, David. "Secure Encryption Challenged by Internet-Linked Computers", Oct. 1997, <http://www.distributed.net/pressroom/56-PR.html>.*

Nechvatal, James. "Public-Key Cryptography", Dec. 1990, <http://www.totse.com/en/privacy/encryption/165728.html>.*

Ryan, Mark Dermot. "Zero Knowledge Protocols", <http://www.cs.bham.ac.uk/~mdr/teaching/modules03/security/students/SS2/handout.htm>.*

Schneier, Bruce. Applied Cryptography, Second Edition, 1996 John Wiley & Sons, pp. 47-49 & 176-177.*

Venkatesan, Ramarathnam et al. "Random Instances of a Graph Coloring Problem are Hard", 1988 ACM.*

Wikipedia. "Zero-knowledge proof", <http://en.wikipedia.org/wiki/Zero-knowledge_proof>.*

Foldoc. Definition: "knapsack problem", 1995.*

Menezes, Alfred J. et al. Handbook of Applied Cryptography, 1997 CRC Press, pp. 11-14, 59-62, 300-306.*

NIST. Definition: "intractable", <http://www.nist.gov/dads/HTML/intratable.html>.*

Schneier, Bruce. Applied Cryptography, Second Edition, 1996 John Wiley & Sons, pp. 2-5, 13-15, 21-22, 47-49, 176-177.*

* cited by examiner

METHOD AND APPARATUS FOR PROTECTING DATA

FIELD OF THE INVENTION

The present invention relates to data protection and more particularly to data protection which is accomplished by encryption. Specifically, a method and apparatus are disclosed for providing a problem which, when solved, results in obtainment of a sequence (i.e., key) which may be used to extract encrypted data.

BACKGROUND OF THE INVENTION

There are many ways in which data can be protected against piracy. A recent and popular method is to send or store the data in an encrypted format. Thus, before the data can be used, the data needs to be decrypted. Typically, software is used so that a user or purchaser of the data can activate the software in order to decrypt the data for use. Such software may be sent or stored along with the data so that the software may be used.

One manner of performing decryption of data is by use of brute force methods. Thus, it is often desirable to protect data content with a large key so that decryption of data by brute force methods cannot be readily accomplished by thieves who are trying to break-the encryption. Consequently, thieves who try to break the encryption focus their efforts on finding the key used to decrypt the data. It is thus desirable to hide the key to increase the tamper resistance of the software.

Many tamper-resistant methods exist that help to hide the key and to obscure the software in which the key is hidden. However, it may be possible to readily find the key despite efforts to hide it. If the key is found by a thief, decryption may readily be accomplished.

SUMMARY OF THE INVENTION

Data is protected and subsequently made available. In an exemplary embodiment of the present invention, an NP-hard problem to be solved is selected. A data structure to be used for representing the problem is selected. An instance of the problem is represented with the data structure. The data is encrypted with a sequence which is obtained by solving the problem.

In an alternative embodiment of the present invention, a program for heuristically solving an NP-hard problem is received. A data structure that represents an instance of the problem is received. The program is applied to the instance of the problem to obtain a sequence. The data is decrypted with the sequence.

DETAILED DESCRIPTION OF THE INVENTION

Figure 1:
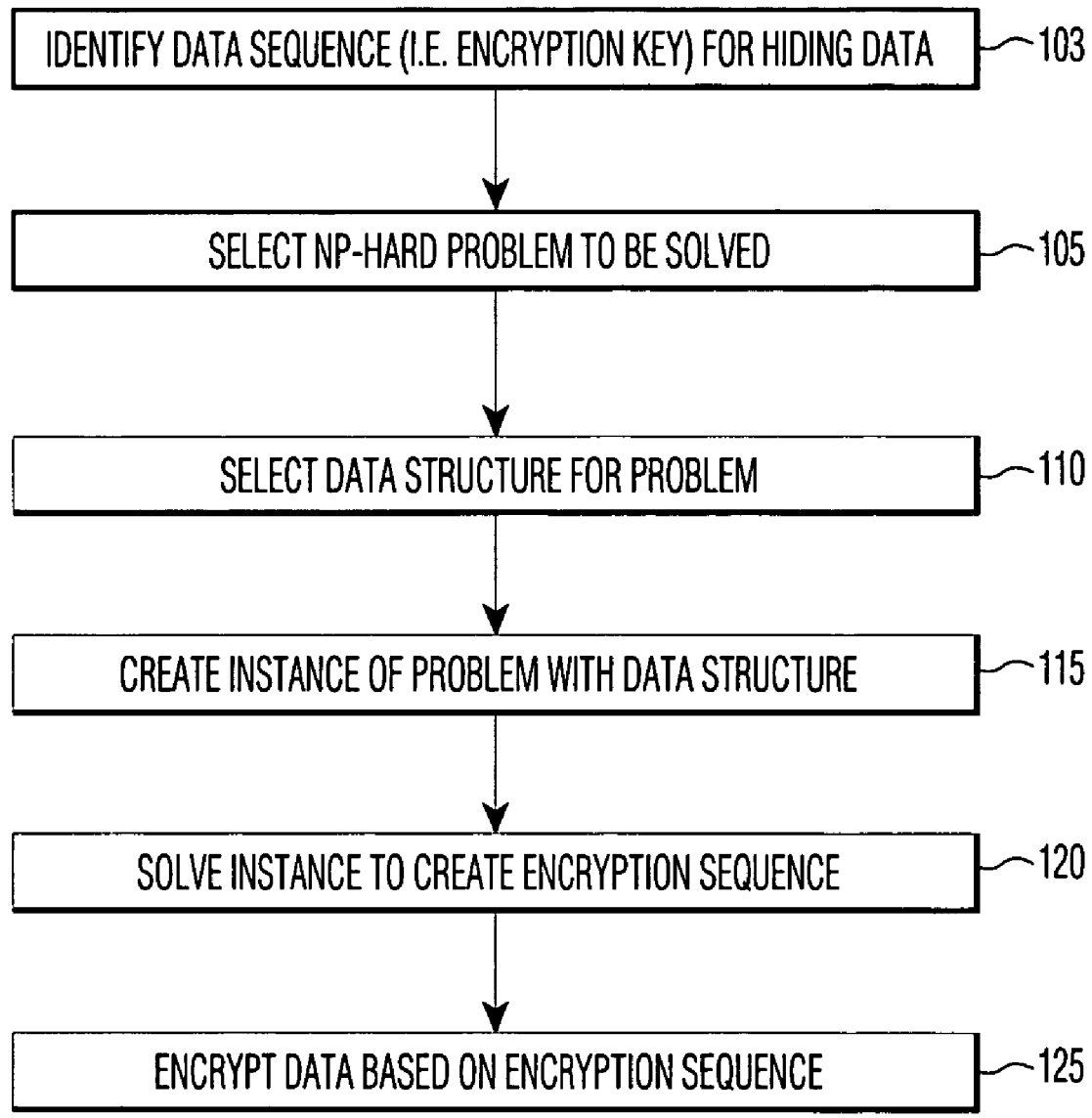
FIGS. 1, 2, 7, 8 and 9 are flowchart diagrams which illustrate operation of exemplary embodiments of the present invention.

Operation of an exemplary embodiment of the present invention will now be described with reference to the flowchart diagram shown in FIG. 1. FIG. 1 is a flowchart diagram showing how a problem is selected and solved in order to hide data. At step 103, a data sequence to be used for hiding data is selected. The data sequence may be, for example, an encryption key. It should be understood that by using the word "encryption", the present inventors are referring to any manner of hiding or transforming data content. Encryption may include one of the more commonly known encryption methods (such as DES). Encryption may indicate a manner in which data is rearranged or placed in different locations. Encryption may alternatively include any other method of controlling the availability of data.

At step 105, a problem to be solved is selected. In an exemplary embodiment of the present invention, the problem to be solved which is selected is an NP-hard problem. NP-hard problems are well known in the art. At step 110, a data structure is selected in which a representation of the problem is to be stored. Then, at step 115, an instance of the problem is created with the data structure. At step 125, data is encrypted based upon the sequence which is represented by the data structure.

Figure 2:
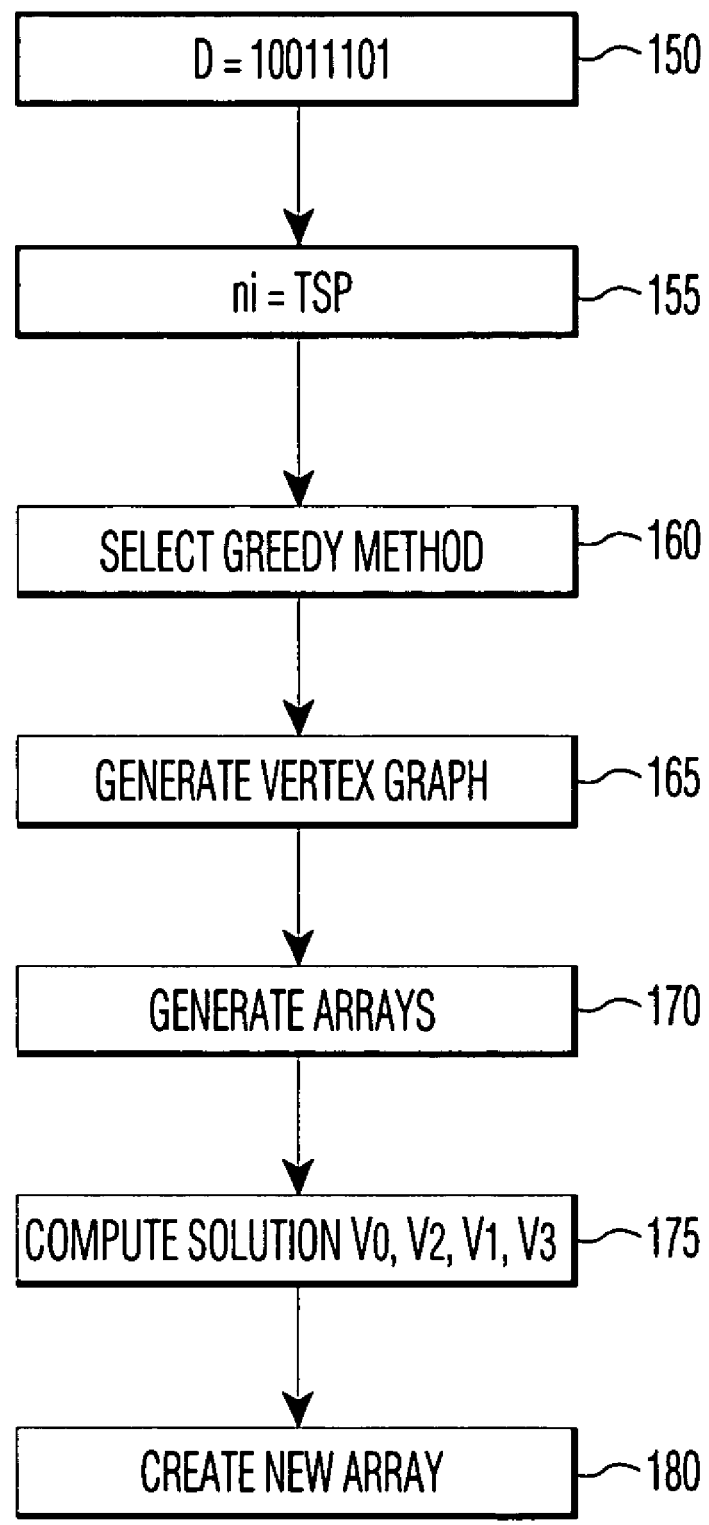

FIG. 2 provides an illustrative example by which exemplary data content is hidden.

At step 150, a data sequence (i.e., encryption key) is selected which will be used for encrypting the data content. In the present example, data sequence D will be an 8-bit string with the sequence 10011101.

Next, at step 155, an NP-hard problem ($n_i$) is selected. In the present example, $n_i$ will be the traveling salesman's problem (TSP) although it will be understood that other problems (i.e., "the knap sack problem") may be used. The TSP is well known in the art. In summary, TSP involves a graph G(V, E) whose edges are labeled with weights. The objective of TSP is to find a path p through graph G that visits every vertex $v_i \in V$ and whose weight is the minimum of all such paths (the optimal path), where the weight of a path p is defined by the sum of all the weights of the edges on p. This is analogous to a real world problem in which the vertices represents cities and the weights represent miles (or amount of travel time) between two cities that an edge $e_j \in E$ connects.

Next, at step 160, a heuristic method is selected which will be used to solve the problem. A number of heuristic methods are known. Examples are:

Simple methods including a brute force method (which will return an optimal path) and a greedy method Classic heuristics: Lin-Kernigan, 1973; Dantzig, Fulkerson & Johnson, 1954; Flood, 1956; Lin 1965; and Croes, 1958

Recent heuristics: Mak-Morton, 1993; Bentley, 1990; and Marten, Otto & Felton, 1991

Genetic Algorithm Approaches: Oliver, Smith & Holland, 1987; Muhlenbein, Gorges-Schleuter & Kramer, 1988; Ulder et al., 1991

Optimal-Linear: Applegate and Bixby, 1998

The above list of heuristic methods may be represented by set H. A heuristic method $h_j$ is thus selected from set H.

As shown at step 160, for purposes of this example, the greedy method is selected. In its simplest form, the greedy method begins at a designated starting vertex of graph G. From there, the greedy method always selects the "cheapest" edge (edge with lowest weight) that travels to a vertex that has not yet been visited. This method assumes that G is a complete graph. Thus, when graph G is randomly created, it must be created such that at least one edge exists between every pair of vertices.

Next, at step 165, a vertex graph is generated. In the example shown in FIG. 3, a vertex graph with four vertices is generated.

A vertex graph can be represented as a simple data structure in which each vertex and edge is situated in an array. A vertex array V[] contains a pointer for each vertex $v_i$. The pointer points to another array that lists the edges incident upon vertex $v_i$. The edge array E[] contains weight values for each edge $e_i$.

At step 170, appropriate arrays are generated. Exemplary arrays are shown, for example, in FIG. 4. The arrays shown in FIG. 4 correspond to the vertex graph shown in FIG. 3. The arrays shown in FIG. 4 are collectively referred to as data structure $DS_t$.

At step 175, a solution to problem $DS_t$ is generated using $h_j$. Based upon vertex graph G shown in FIG. 3, the solution $v_0$, $v_2$, $v_1$, $v_3$ is obtained. This is not an optimal solution. Because all heuristic methods can be run deterministically, the same result can be attained every time given an identical graph.

Figure 3:
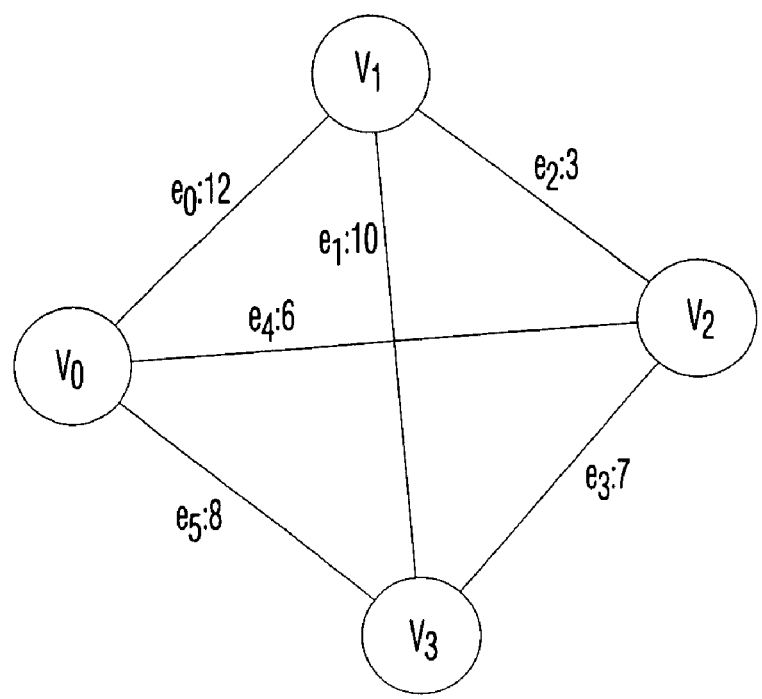
FIG. 3 is a graph which is useful for describing illustrative operation of an exemplary embodiment of the present invention.
Figure 4:
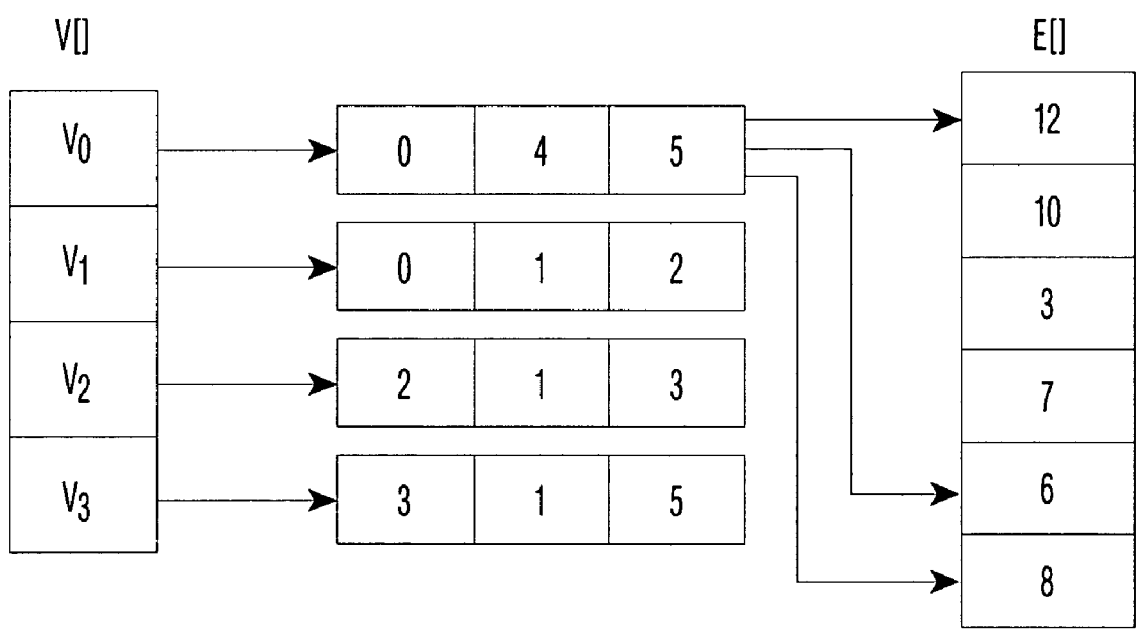
FIG. 4 is a data structure which is useful for describing illustrative operation of an exemplary embodiment of the present invention.
Figure 5:
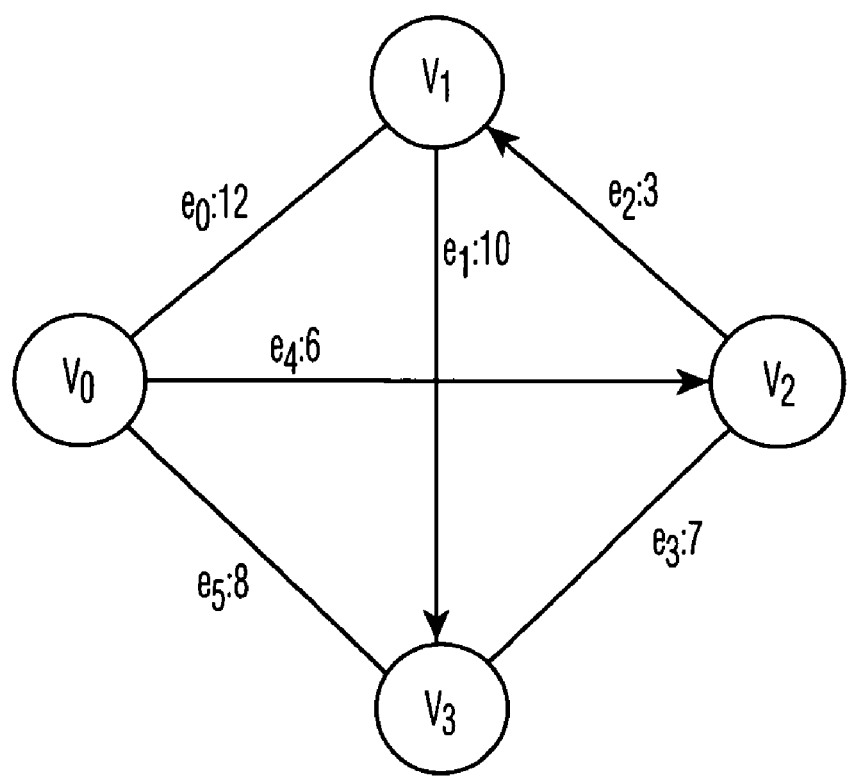
FIG. 5 is a graph which is useful for describing illustrative operation of an exemplary embodiment of the present invention.

The solution to the TSP shown in FIG. 3 may be represented with the weighted edges shown in FIG. 5.

Figure 6:
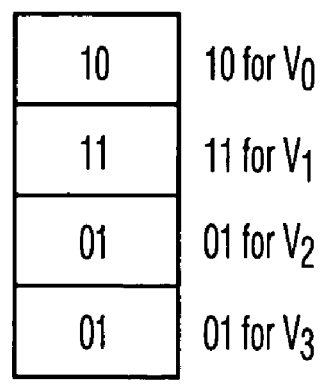
FIG. 6 is a data structure which is useful for describing illustrative operation of an exemplary embodiment of the present invention.
Figure 7:
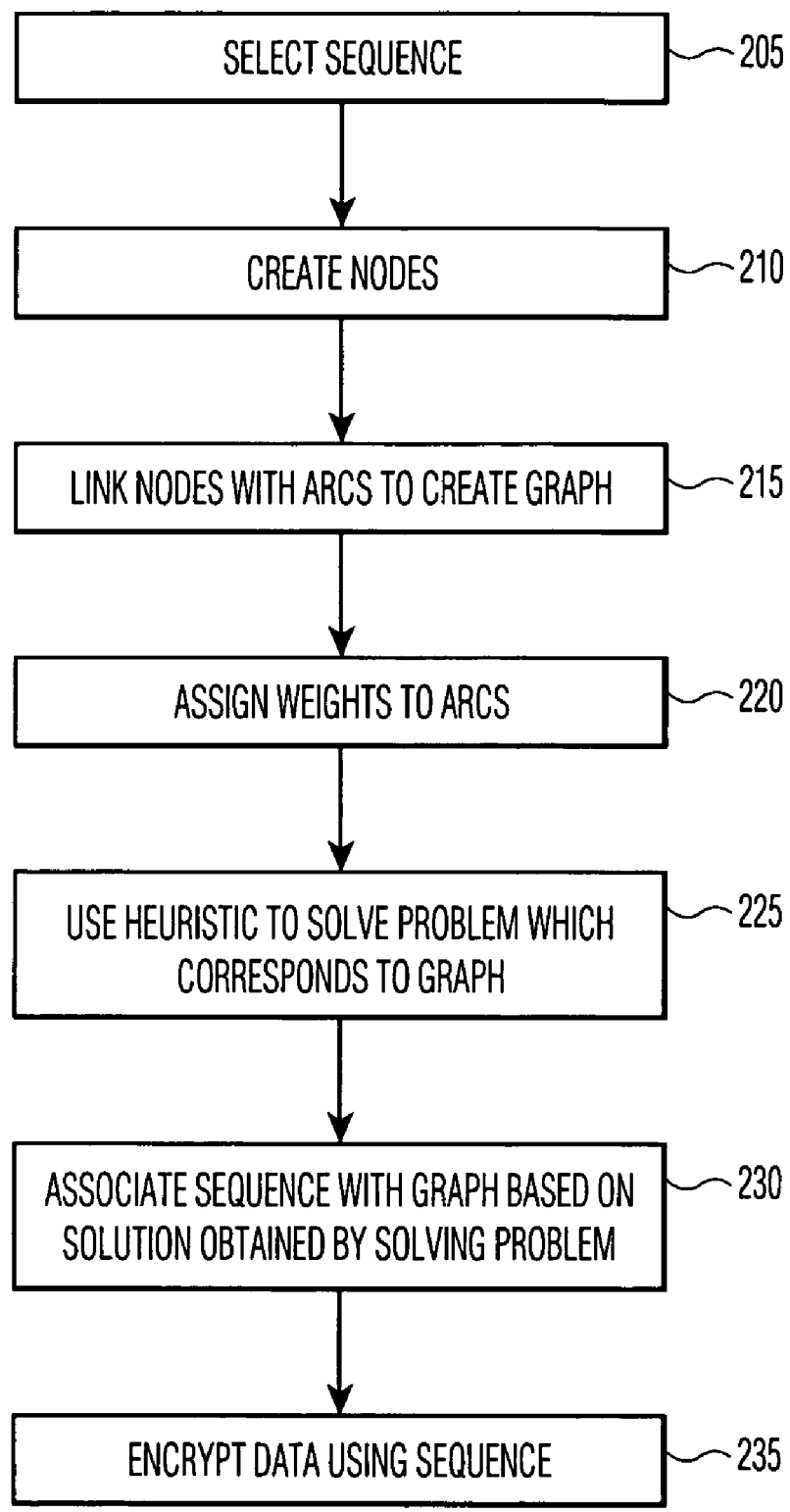

Given the solution shown in FIG. 5, data sequence D equal to 10011101 is stored. This is accomplished by adding an extra array that labels each vertex with 2 bits (8 bits/v vertices=2 bits per vertex for this example). The added array is shown in FIG. 7. Thus, as one walks the path which corresponds to the graph shown in FIG. 6, the data sequence D equal to 10011101 is revealed.

Figure 9:
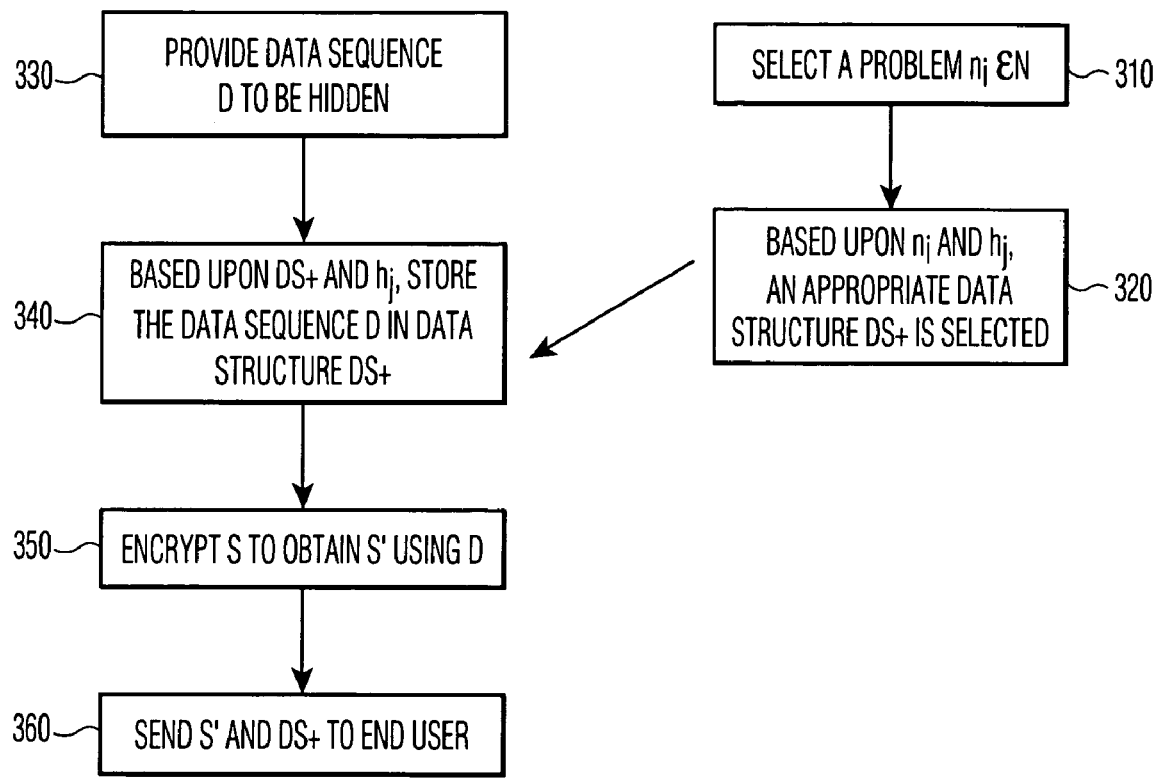

The example shown in FIG. 2 can be further illustrated with the help of the flowchart shown in FIG. 9. Step 310 refers to N. N is the set of NP-hard problems from which to choose a problem to store data sequence D. Thus, at step 310, a problem $n_i \in N$ is selected. Next, step 320 is performed. Step 320 is based upon $h_j$ which is a deterministic heuristic solution (from a set of deterministic heuristic solutions H) for solving $n_i$. Thus, at step 320, based upon $n_i$ and $h_j$, an appropriate data structure $DS_t$ is selected. At step 330, data sequence D to be hidden is provided. At step 340, based upon $DS_t$ and $h_j$, the data sequence D is stored in data structure $DS_t$. Finally, processing proceeds to step 350. Step 350 is based upon S which is the data to be encrypted. Thus, at step 350, S is encrypted to obtain S'. S is encrypted to obtain S' using D. Finally, at step 360, S' and $DS_t$ are sent to the end user. S' and $DS_t$ may be provided separately to an end user or they may be combined prior to being sent. Thus, S' and $DS_t$ may be provided in a common physical medium.

Data sequence D may be stored in data structure $DS_t$ in accordance with the steps which are illustrated in the flowchart diagram shown in FIG. 7. At step 205, data sequence D may be selected. Data sequence D may be, for example, randomly selected. At step 210, a plurality of nodes (i.e., which correspond to a graph) are created. The nodes are desirably created so that they correspond to the length of the sequence selected at step 205. At step 215, the nodes are linked with a plurality of arcs to create a graph. The nodes may be, for example, randomly linked. At step 220, weights are assigned to the arcs. Again, the weights may be assigned randomly. At step 225, a heuristic is used to solve a problem which corresponds to the graph. The problem may be, for example, an NP-hard problem.

At step 230, the sequence is associated with the graph based on a solution obtained by solving the problem. Finally, at step 235, the data is encrypted using the sequence.

Figure 8:
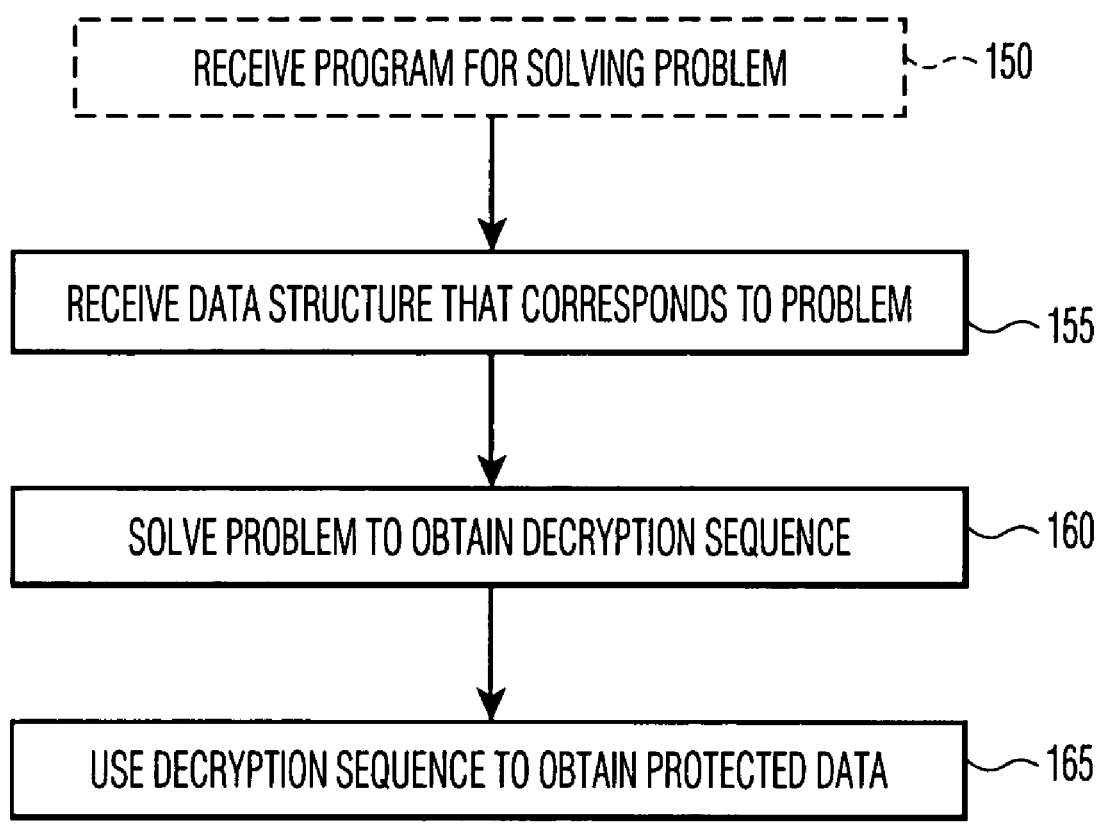

At the end user side (for example), it is possible to obtain data sequence D (i.e., the decryption key) using the data structure $DS_t$ and heuristic $h_j$ described above. Thus, as shown in FIG. 8, at step 150, the end user must have access to the heuristic. The heuristic $h_j$ may be sent to the end user either with encrypted data S' or separately. At step 155, the data structure $DS_t$ is also received. At step 160, the problem represented by $DS_t$ is solved to obtain data sequence D. Then, at step 165, data sequence D is applied to encrypted data S' (as a decryption key, for example) in order to obtain data S.

Figure 10:
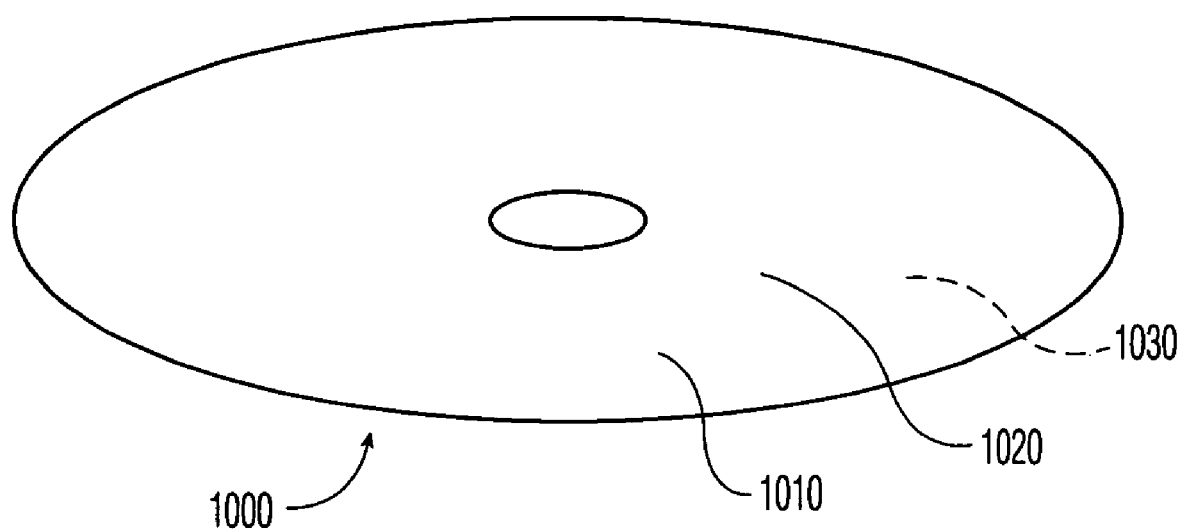
FIG. 10 is a storage device in accordance with an exemplary embodiment of the present invention.

Thus, in an exemplary embodiment of the present invention as illustrated in FIG. 10, a storage device 1000 may be provided. Storage device 1000 (which may be any storage device—a disk is shown merely as an example) includes a data structure 1010 that corresponds to an NP-hard problem as described above. Storage device 1000 (or another storage device) may also include heuristic 1020 for solving the problem and, again, is chosen as described above. The problem represented by data structure 1010 may thus be solved using the heuristic to obtain the data sequence which is used to decrypt protected data. Of course, protected data 1030 may also be included in a storage device (i.e., storage device 1000) and may be decrypted using the data sequence obtained above.

It is noted that any NP-hard problem in which the objects of the solution can be ordered can be immediately substituted in place of the chosen TSP problem. For instance, the Knap-Sack problem is the NP-hard problem where one is given a knap-sack of size x and a set O of weighted objects. The goal is to fill the knap-sack with as many objects from set O as possible subject to the constraint that the total weight of all objects placed within the knap-sack must not exceed x. Once a solution is found, the objects can be ordered by weight and then labeled with bits as described above.

An instance that does not fit the above example is the satisfiability problem (SAT). In this problem one must try and determine if a given logical expression can be satisfied (a logical expression is satisfied if it computes to 1). One must assign 0 or 1 to the variables in the expression in order to determine an assignment of values that proves the expression satisfiable (or unsatisfiable if all checks return 0). Typically, a natural ordering of the variables does not exist. Fortunately, one can use the solution as the encryption key, effectively hiding the data through use with any standard encryption method.

It is also noted that the choice of heuristic does not matter as long as the heuristic always returns the same answer (the method must be deterministic).

The above description refers to the hiding (encryption) and extraction (decryption) of data. It is understood that the "data" can be in many forms, including numerical information, alphanumeric information, text, software programs (source code, object code, etc.) or any other form of content which may be hidden (encrypted).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A computerized method of protecting data, said method comprising the steps of:
    selecting an NP-hard problem to be solved;
    selecting a data structure to be used for representing said problem;
    representing an instance of said problem by using contents of said data structure;
    solving said problem as represented by said contents of said data structure;
    encrypting said data with a sequence which is obtained by solving said problem; and
    transmitting said encrypted data and said contents of said data structure.

2. A computerized method of protecting data according to claim 1, further comprising the step of providing said data structure and said encrypted data to a common physical medium.

3. A computerized method of protecting data according to claim 1, wherein said data structure corresponds to a graph.

4. A computerized method of protecting data according to claim 3, wherein said graph includes a plurality of nodes and a plurality of edges which represent said problem.

5. A computerized method of protecting data according to claim 1, wherein said problem is solved using a heuristic.

6. A computerized method of protecting data, comprising the steps of:
    selecting a sequence;
    creating a plurality of nodes;
    linking said plurality of nodes with a plurality of arcs to create a graph;
    assigning weights to each of said arcs;
    using a heuristic to solve a problem which corresponds to said graph;
    associating said sequence with said graph based on a solution obtained by solving said problem;
    encrypting said data using said sequence; and
    transmitting said encrypted data and said sequence.

7. A computerized method of processing protected data, said method comprising the steps of:
    receiving said protected data which has been encrypted with a sequence obtained by solving an NP-hard problem;
    receiving a program for heuristically solving said NP-hard problem;
    receiving contents of a data structure that corresponds to said problem;
    applying said program to said problem to obtain said sequence; and
    decrypting said data with said sequence.

8. A computerized method of processing protected data according to claim 7, wherein said problem is the traveling salesman problem.

9. A computerized method of processing protected data according to claim 7, wherein said data structure corresponds to a graph.

* * * * *